US007749072B1

(12) United States Patent
Singer et al.

(10) Patent No.: US 7,749,072 B1
(45) Date of Patent: Jul. 6, 2010

(54) METHOD OF PROVIDING FREE GAMES ON A SLOT MACHINE DEVICE

(75) Inventors: Anthony Mark Singer, Ringwood, NJ (US); Daniel Mordecai Marks, Cold Spring, NY (US); Howard Mitchell Marks, Scardale, NY (US)

(73) Assignee: PTT LLC, Mahwah, NJ (US)

( * ) Notice: Subject to any disclaimer, the term of this patent is extended or adjusted under 35 U.S.C. 154(b) by 853 days.

(21) Appl. No.: 11/252,641

(22) Filed: Oct. 18, 2005

Related U.S. Application Data

(60) Provisional application No. 60/619,806, filed on Oct. 18, 2004, provisional application No. 60/670,399, filed on Apr. 12, 2005.

(51) Int. Cl.
*A63F 13/00* (2006.01)

(52) U.S. Cl. .............................. 463/20; 463/16; 463/18; 463/19; 463/26

(58) Field of Classification Search ............. 463/16–20, 463/22, 26–28
See application file for complete search history.

(56) References Cited

U.S. PATENT DOCUMENTS

| | | | | |
|---|---|---|---|---|
| 4,624,459 | A * | 11/1986 | Kaufman | 463/20 |
| 5,123,649 | A * | 6/1992 | Tiberio | 273/143 R |
| 5,653,636 | A * | 8/1997 | Takemoto et al. | 463/20 |
| 6,168,519 | B1 * | 1/2001 | Nakagawa et al. | 463/4 |
| 6,287,197 | B1 * | 9/2001 | Dickinson et al. | 463/31 |
| 6,375,568 | B1 * | 4/2002 | Roffman et al. | 463/26 |
| 6,443,837 | B1 * | 9/2002 | Jaffe et al. | 463/16 |
| 6,604,740 | B1 * | 8/2003 | Singer et al. | 273/292 |
| 6,843,723 | B2 * | 1/2005 | Joshi | 463/25 |
| 2002/0151349 | A1 * | 10/2002 | Joshi | 463/20 |
| 2008/0139299 | A1 * | 6/2008 | Okada | 463/21 |

* cited by examiner

*Primary Examiner*—James S. McClellan
*Assistant Examiner*—Sunit Pandya

(57) ABSTRACT

The present invention includes a variety of methods to provide free games on a slot machine device until the appearance of two or more predetermined symbol combinations in the symbol matrix. A preferred embodiment, Capture Spins, provides free games until three, winning Capture symbol combinations appear in the symbol matrix.

15 Claims, 6 Drawing Sheets

METHOD OF PROVIDING FREE GAMES ON A SLOT MACHINE DEVICE

PRIORITY CLAIM

This application is a non-provisional patent application that claims priority to and the benefit of U.S. Provisional Patent Application Ser. No. 60/619,806 filed on Oct. 18, 2004, and U.S. Provisional Patent Application Ser. No. 60/670,399 filed on Apr. 12, 2005, both incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

In general, the present invention relates to methods of providing free games on a slot machine device. More particularly, the present invention provides free games until two or more predetermined symbol combinations appear in the symbol matrix.

BACKGROUND OF THE INVENTION

To play a conventional slot machine, the player deposits money into the machine, sets the wager, and spins the reels. When the reels stop spinning, the player collects credits for winning symbol combinations displayed on the reels, if any, according to a predetermined pay schedule.

While the appearance of conventional slot machines may change from one theme, such as space aliens, to another, such as farm animals, the underlying methods of play—setting the wagering, spinning the reels, and collecting awards—remain the same.

The conventional slot machine, therefore, does not satisfy the evolving needs of players, casinos, and manufacturers. Players tire of games using the same methods of play; casinos cannot distinguish their games offerings from other casinos; and manufacturers cannot distinguish their products from other manufacturers.

New methods of playing slot machines, therefore, are required to provide players, casinos, and manufacturers with uniquely entertaining slot machine games.

BRIEF DESCRIPTION OF THE DRAWINGS

The accompanying figures illustrate various stages of a preferred embodiment of the Present Invention.

DESCRIPTION OF THE INVENTION

The present invention includes a variety of methods to provide free games on a slot machine device until two or more predetermined symbol combinations appear in the symbol matrix. A preferred embodiment, Capture Spins, provides free games until three, winning Capture symbol combinations appear in the symbol matrix.

Capture Spins

The Capture Spins embodiment functions as a free spin bonus game to a primary slot machine game. A predetermined combination of symbols in the primary game triggers the Capture Spins bonus game.

Once triggered, the Capture Spins bonus game provides free games until the appearance of at least one of three different Capture Symbol combinations, as illustrated in FIGS. 1 to 6.

Figure 1:
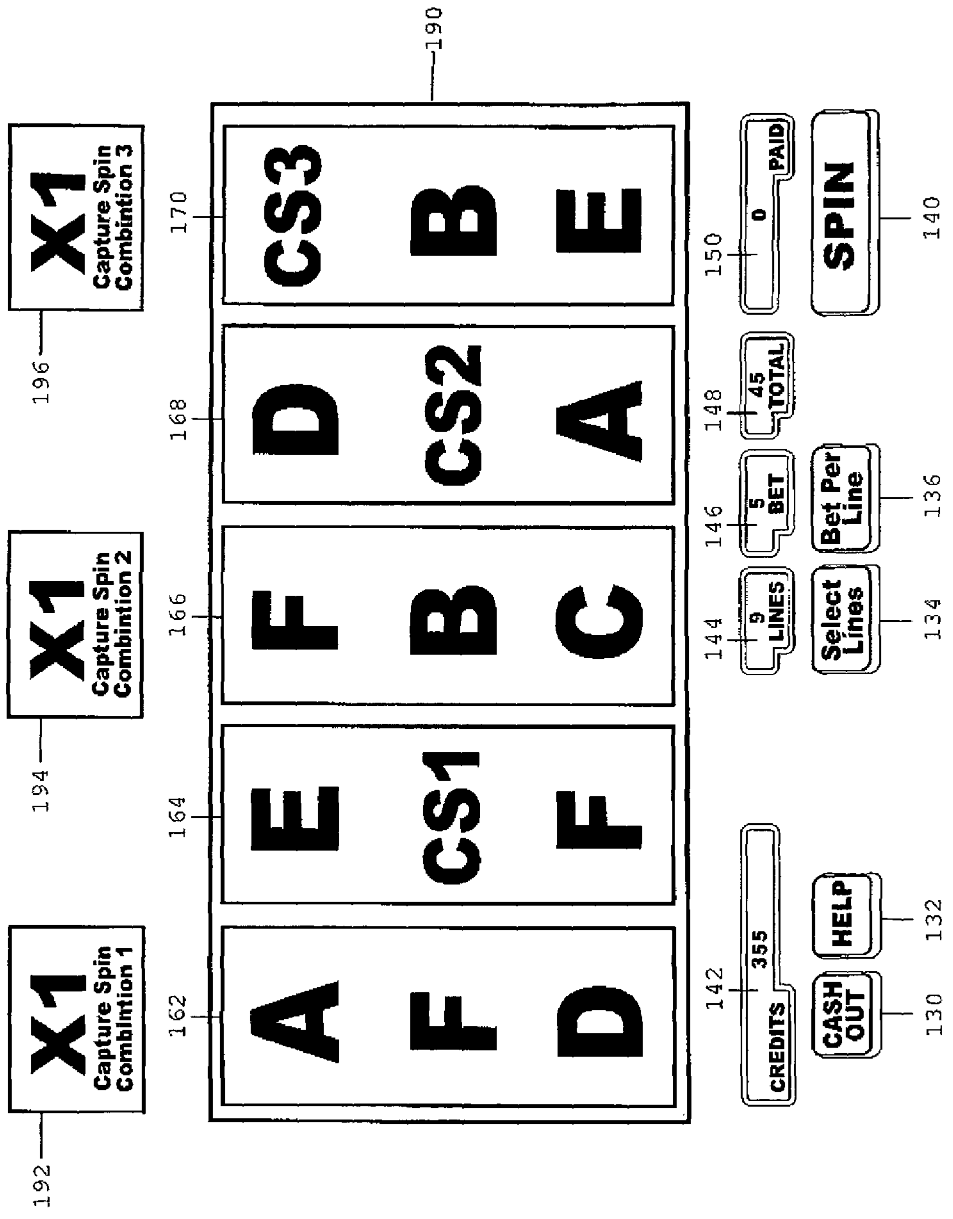
FIG. 1 shows a game screen using a 3-row by 5-column symbol matrix, with 15 symbol positions.

FIG. 1 shows the Capture Spins bonus game operating in a 3-row by 5-column symbol matrix 190, with 15 symbol positions on the reels 162-170. A counter for each Capture Symbol combination—CS1(x1) 192, CS2(x1) 194, CS3(x1) 196—is displayed above the matrix.

The Capture Symbol combination counters 192-196 record the appearance of the Capture Symbol combinations. Free games continue until the counters record the appearance of at least one of each Capture Symbol combination.

Further, the Capture Symbol combination counters display the award enhancer for each combination. The award enhancer value increases with each appearance of a Capture Symbol combination.

Figure 2:
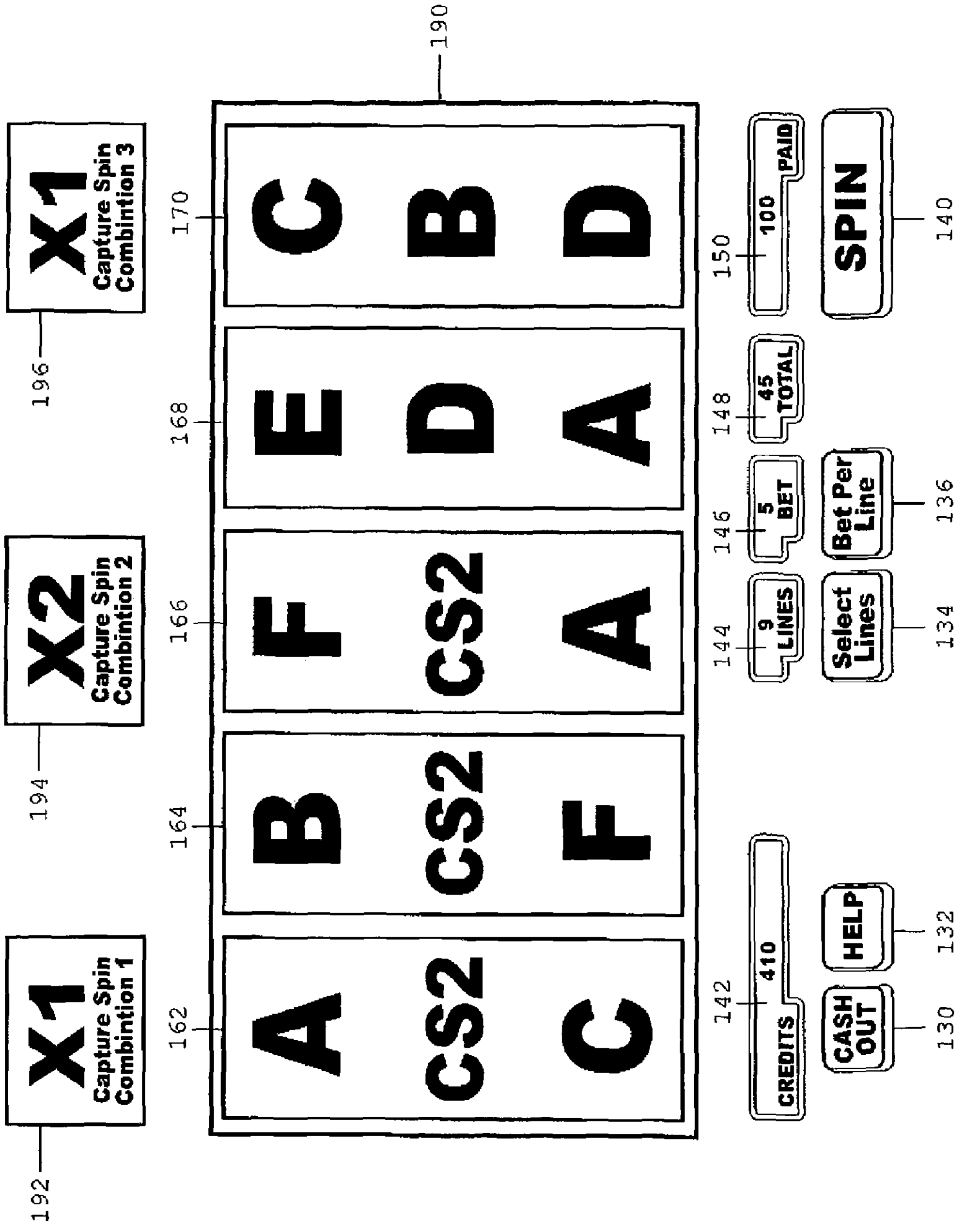
FIG. 2 shows a game screen with a CS2 symbol combination.

FIG. 2 shows the appearance of a CS2 symbol combination on the reels 162, 164, 166 of the symbol matrix 190. The game issues the base award for CS2-CS2-CS2, as shown on the paid meter 150. The CS2 counter 194 highlights and the award enhancer increases from x1 to x2.

Figure 3:
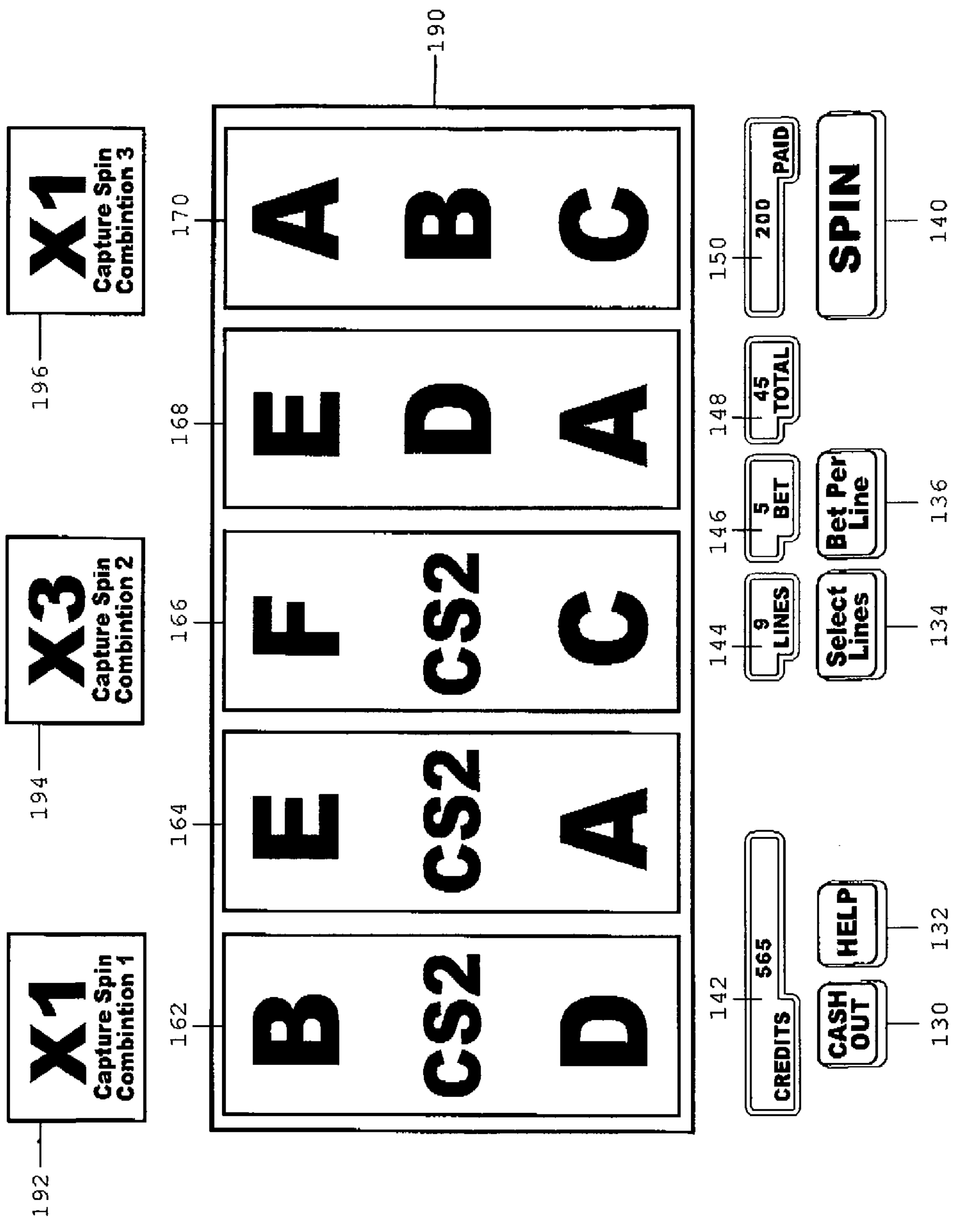
FIG. 3 shows a game screen with another CS2 symbol combination.

FIG. 3 shows the appearance of another CS2 symbol combination on the reels 162, 164, 166 of the symbol matrix 190. The game issues the base award for CS2-CS2-CS2 times the award multiplier of 2, as shown on the paid meter 150. The CS2 counter 194 remains highlighted and the award enhancer increases from x2 to x3.

Figure 4:
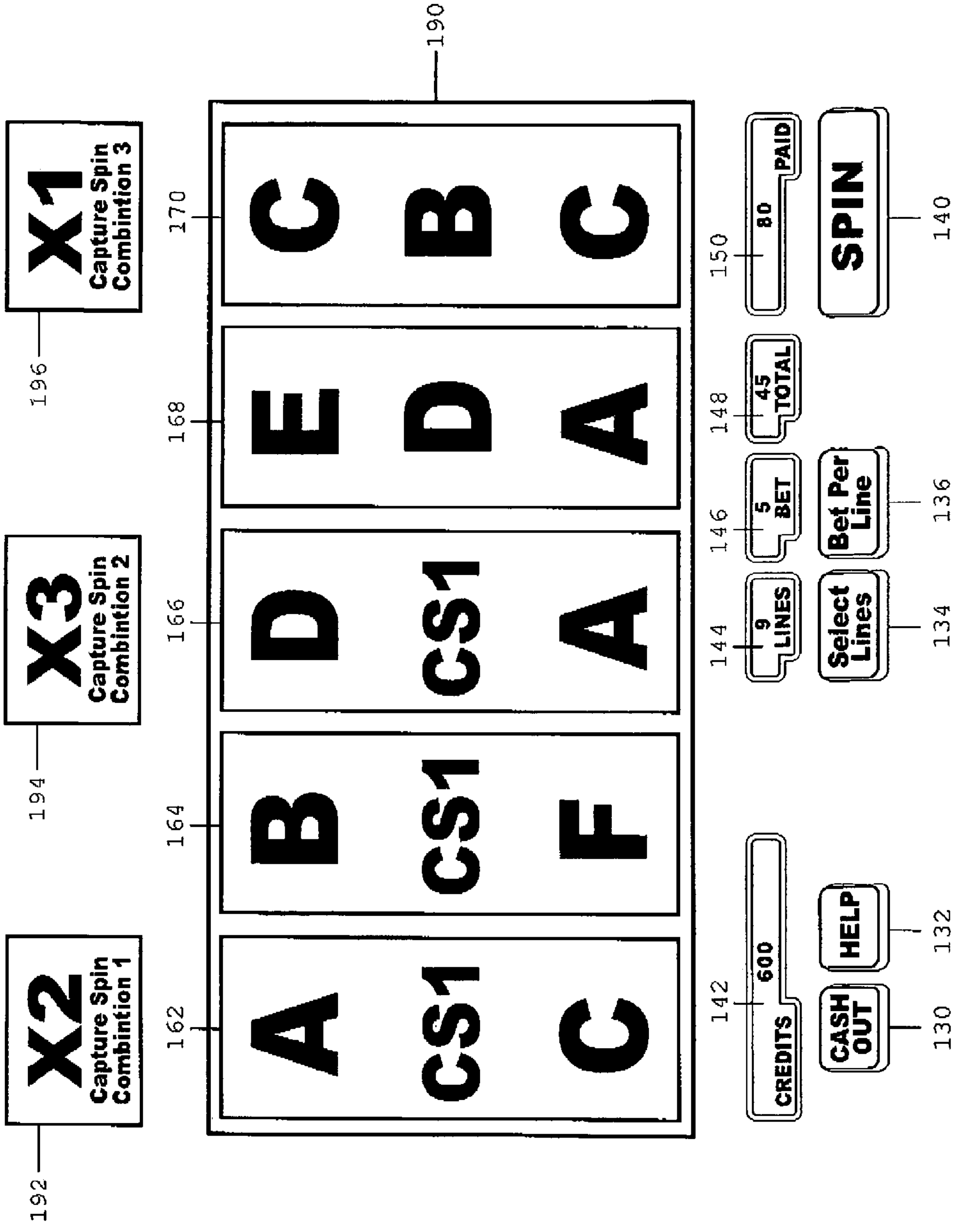
FIG. 4 shows a game screen with a CS1 symbol combination.

FIG. 4 shows the appearance of a CS1 symbol combination on the reels 162, 164, 166 of the symbol matrix 190. The game issues the base award for CS1-CS1-CS1, as shown on the paid meter 150. The CS1 counter 192 highlights and the award enhancer increases from x1 to x2.

Figure 5:
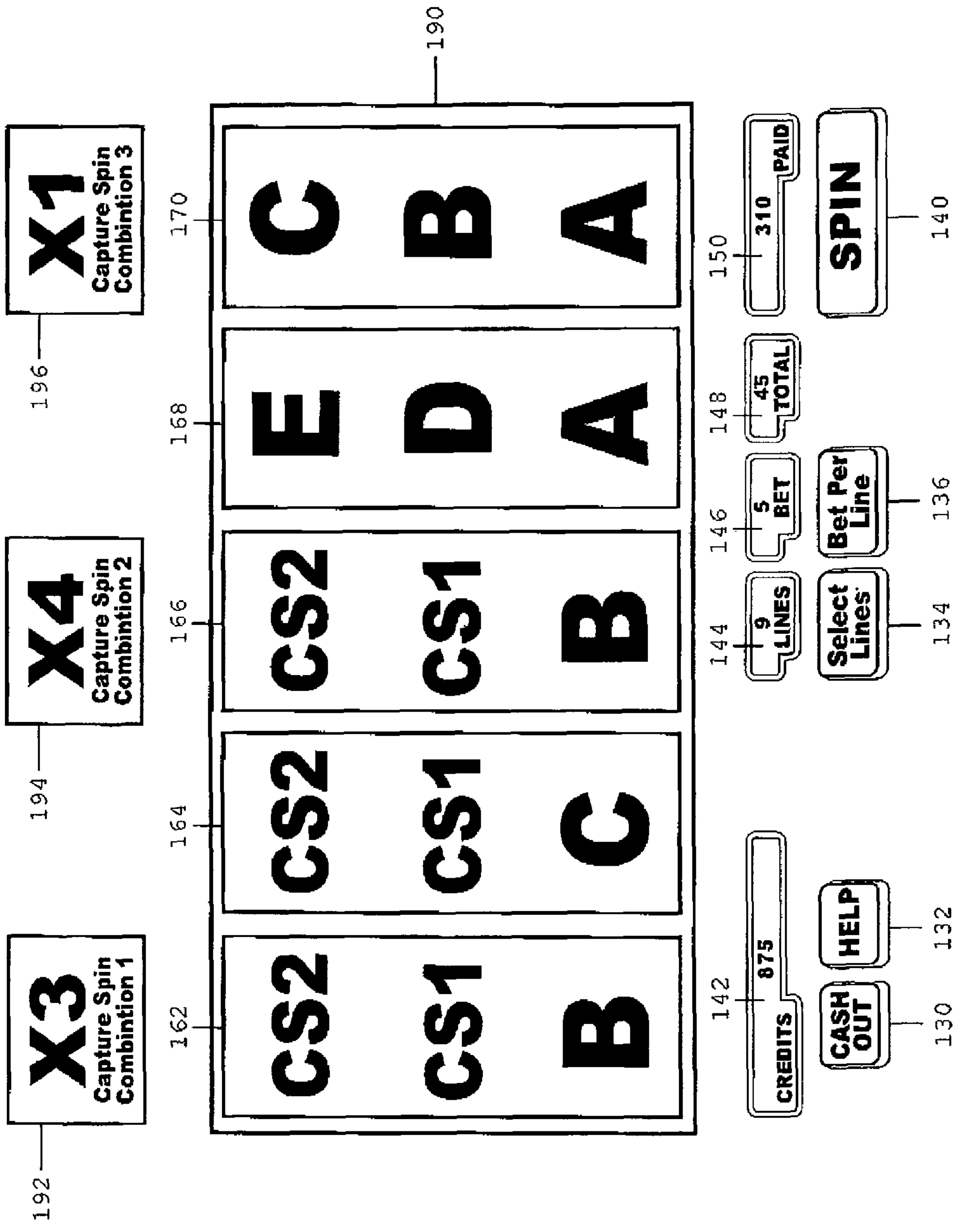
FIG. 5 shows a game screen with CS1 and CS2 symbol combinations.

FIG. 5 shows the appearance of CS1 and CS2 symbol combinations on the reels 162, 164, 166 of the symbol matrix 190. The game issues an enhanced award for CS1-CS1-CS1, using the 2X multiplier value, and an enhanced award for CS-2-CS2-CS-2, using the 3X multiplier value, as shown on the paid meter 150. The CS1 and CS2 counters 192 and 194 remain highlighted and the award enhancers increase by 1.

Figure 6:
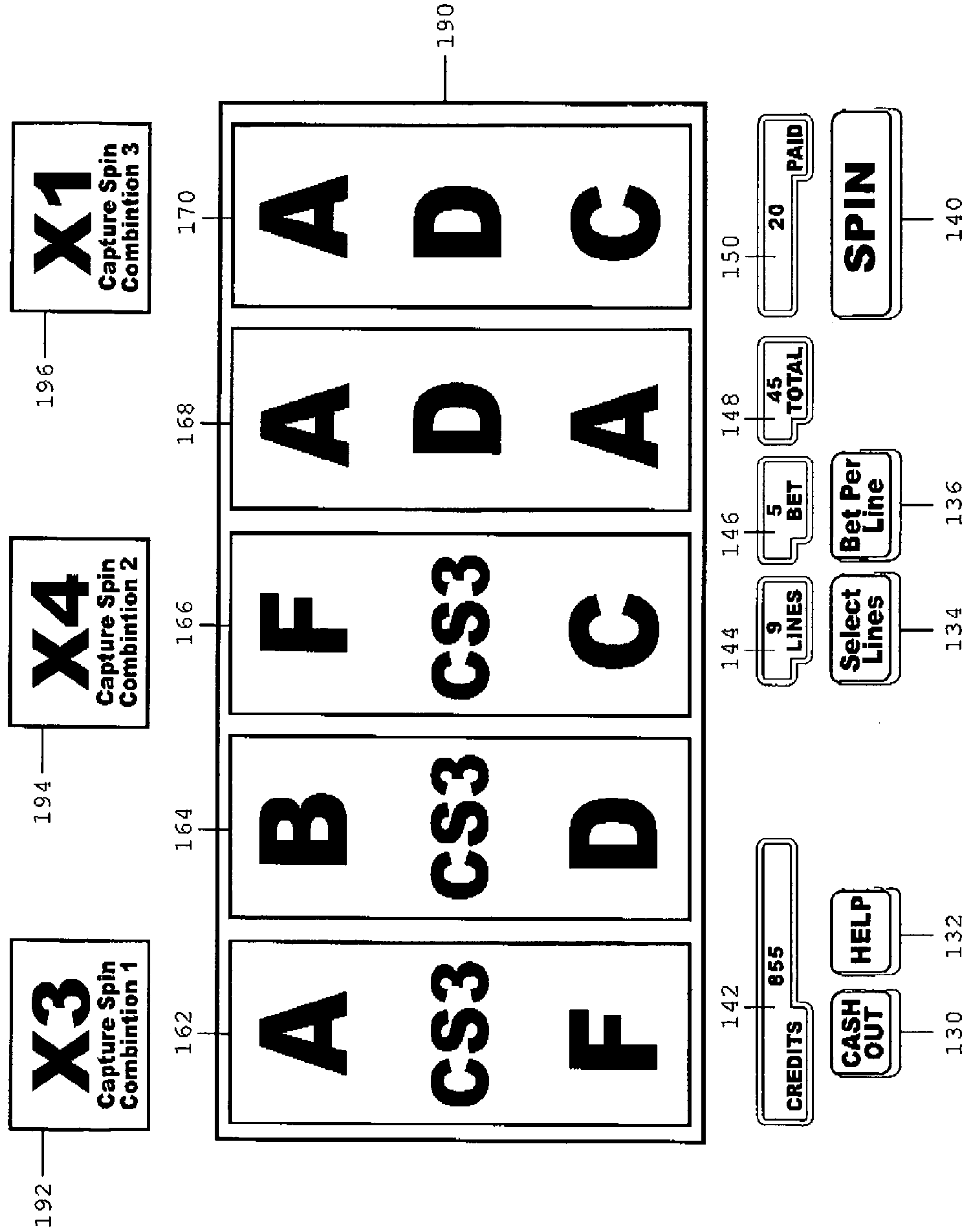
FIG. 6 shows a game screen with a CS3 symbol combination.

FIG. 6 shows the appearance of a CS3 symbol combination on the reels 162, 164, 166 of the symbol matrix 190. The game issues the base award for CS3-CS3-CS3, as shown on the paid meter 150. The CS3 counter 196 highlights, along with the CS1 and CS2 counters 192 and 194, to indicate the attainment of all three Capture Symbol combinations. The award enhancer for CS3 shown in the CS3 counter 196 does not increase.

Upon achieving all three Capture Symbol combinations, the Capture Spins bonus game ends, accumulated awards issue, and the base slot machine game resumes.

Upon returning to the base game, the player may continue to wager upon the gaming machine and spin the reels provided that a positive balance of credits displays on the Credit meter 142. The player may spin the reels by pressing the spin button 140. The player may adjust the wager either by using the Select Lines button 134 to adjust the number of selected pay lines, as shown in the Lines meter 144, or by using the Bet Per Line button 136 to adjust the number of credits wagered per selected pay line, as shown on Bet meter 146. The total wager amount is displayed on the Total meter 148. The player may also press the Help button 132 to view the rules of the game or collect the balance of credits by pressing the Cash Out button 130.

ALTERNATIVE EMBODIMENTS OF THE INVENTION

In addition to the preferred embodiment, as described above, the present invention may be modified in one or more aspects, including but not limited to the following alternative embodiments:

In one embodiment, free games may take place in a symbol matrix of any size. For example, the free games may take place in a symbol matrix with 4 rows and 6 columns using 24 symbol positions.

In another embodiment, free games may continue until any number of different symbol combinations appear in the symbol matrix. For example, free games may continue until symbol combinations A, B, C, D, and E appear in the symbol matrix.

In another embodiment, free games may continue until any number of same symbol combinations appear in the symbol matrix. For example, free games may continue until symbol combination A appears three times in the symbol matrix.

In another embodiment, free games may continue until symbol combinations of any length appear in the symbol matrix. For example, free games may continue until two combinations of 4 or more "Z" symbols appear in the symbol matrix.

In another embodiment, free games may continue until symbol combinations using any type of symbols, including same or different kinds of symbols. For example, free games may continue until 2 symbol combinations using at least 2 "X" symbols and one "Y" symbol.

In one embodiment, free games may continue until any kinds of winning symbol combinations appear in the symbol matrix, including line pay or scatter pay combinations. For example, free games may continue until 4 winning symbol combinations using at least 4 "Y" symbols scattered anywhere in the symbol matrix.

In another embodiment, the type of symbol combinations may be defined in any manner, including combinations predetermined by the gaming device, selected by the player, or set at random. For example, the player may select symbol combinations A and B from symbol combinations A through F; free games continue until symbol combinations A and B appear in the symbol matrix.

In another embodiment, the number of symbol combinations may be defined in any manner, including combinations predetermined by the gaming device, selected by the player, or set at random. For example, 5 may be randomly selected from a range of 3 to 8; free games continue until 5 symbol combination A's appear in the symbol matrix.

In another embodiment, repeated symbol combinations may enhance awards in any manner. For example, repeating symbol combination A may result in the doubling of all subsequent awards.

In another embodiment, any number of repeated symbol combinations may enhance awards. For example, repeating symbol combination A more than 5 times may result in an award enhancement.

In another embodiment, repeated symbol combinations may enhance awards for any duration. For example, repeating symbol combination A may result in the tripling all awards over the subsequent 4 games.

In another embodiment, the present invention operates as a base game. For example, the present invention operates as a base slot machine game in which additional wildcard positions appear randomly during each game.

SCOPE OF THE INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The patent application and claims, therefore, seek to cover all features and advantages that fall within the true spirit and scope of the present invention.

We claim:

1. A method of operating an electronic gaming device via a processor, comprising:

the processor operable to display a game using a symbol matrix formed by at least one row intersecting with a plurality of columns, wherein said rows and columns include a plurality of symbols;

a) the processor operable to accept a wager to start the game;

b) the processor operable to define one or more predetermined symbol combinations and one or more counters associated with each said predetermined symbol combination;

c) the processor operable to randomly rearrange the plurality of symbols in said symbol matrix;

d) the processor operable to display said rearranged symbols;

e) the processor operable to determine whether one or more of said predetermined symbol combinations is displayed in the rearranged symbol matrix;

f) the processor operable to increment said associated counter for each predetermined symbol combination displayed g) the processor operable to issue awards for any winning combinations; and h) the processor operable to repeating steps c) through g) without placing an additional wager if any of said counters has not reached a predetermined value.

2. A method of claim 1 wherein the game operates as a secondary bonus game to a primary slot machine game.

3. A method of claim 1 wherein said symbol matrix is formed by 3 rows and 5 columns.

4. A method of claim 1 in wherein said each predetermined symbol combination is selected by the gaming device.

5. A method of claim 1 wherein said each of the predetermined symbol combinations uses at least 3 symbols and is different from the other predetermined symbol combinations.

6. A method of claim 1 wherein said number of predetermined symbol combinations is determined said processor.

7. A method of claim 1 wherein there are 3 predetermined symbol combinations and each predetermined symbol combinations uses at least 3 of the same symbols.

8. A method of claim 1 wherein said each of the predetermined symbol combinations are also winning symbol combinations.

9. A method of claim 1 wherein said each of the predetermined symbol combinations are a subset of all winning symbol combinations.

10. A method of claim 1 wherein said award for each of the predetermined symbol combinations is enhanced based upon the value of said counter associated with each said predetermined symbol combination.

11. A method of claim 1 wherein said processor is operable to determines the number of times that each of the predetermined symbol combinations must appear in the symbol matrix to meet the predetermined value associated with the counter.

12. A method of claim 1 wherein steps c) to g) are repeated until the value of each said counter associated with each said predetermined symbol combination is equal to three.

13. A method of claim 1 wherein the value of each said counter associated with each said predetermined symbol combination is displayed on a meter.

14. A method of claim 1 wherein award enhancers for each predetermined symbol combination are displayed on a meter.

15. A method of operating an electronic gaming device via a processor comprising;

the processor operable to display a game using a symbol matrix formed by rows intersecting with five columns, wherein said rows and columns include a plurality of symbols;

the processor operable to accept a wager to participate in a primary game;

the processor operable to randomly rearrange the plurality of symbols in said symbol matrix;

the processor operable to display said rearranged symbols;

the processor operable to issue awards for any winning symbol combinations;

the processor operable to define a triggering event that starts a secondary bonus game, wherein said processor is operable to operate said secondary game by performing the following steps:

a) setting three predetermined symbol combinations, wherein each said combination is determined by the game, is comprised of at least three same symbols wherein said symbols are different from said other predetermined symbol combinations b) randomly rearranging the plurality of symbols in the symbol matrix;

c) displaying the rearranged symbols in the original symbol matrix;

d) determining whether any of the three predetermined symbol combinations appear in the symbol matrix;

e) displaying the number of appearances in the symbol matrix of each predetermined symbol combination on a meter;

f) issuing awards for winning combinations, wherein said awards are issued according to a pay schedule for the appearance of predetermined symbol combinations and other winning combinations;

g) enhancing an award for the appearance of a predetermined symbol combinations such that the enhanced award is equal to the amount defined for said symbol combination in a predetermined pay schedule multiplied by the number of appearances displayed on said meter;

h) repeating steps b) thru g) without placing an additional wager until said meter associated with each of the predetermined winning combinations displays three; and i) returning to said primary game upon conclusion of said secondary game.

* * * * *